United States Patent
Habert et al.

(10) Patent No.: US 8,795,459 B2
(45) Date of Patent: Aug. 5, 2014

(54) METHOD FOR PRODUCING A TRIM ELEMENT HAVING A DECORATIVE AREA WITH A PARTICULAR APPEARANCE

(75) Inventors: Cédric Habert, Le Fay Saint Quentin (FR); Nicolas Pegorier, Parmain (FR); Jean Oeuvrard, Pontoise (FR); Thierry Vourlat, L'Isle Adam (FR); Didier Ponthieu, La Neuvile Saint Pierre (FR); Sébastien Diliberto, Herchies (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/571,042

(22) Filed: Aug. 9, 2012

(65) Prior Publication Data

US 2013/0199695 A1   Aug. 8, 2013

(30) Foreign Application Priority Data

Aug. 9, 2011   (FR) ..................................... 11 57265

(51) Int. Cl.
*B29C 59/02*   (2006.01)
(52) U.S. Cl.
USPC ........... 156/219; 156/228; 156/285; 156/580; 264/293
(58) Field of Classification Search
CPC ................ B29L 2031/3005; B29L 2031/3008; B29L 2031/302; B29L 2031/3041; B60R 13/02; B60R 13/0237; B60R 13/0256; B60R 13/0262; B29C 59/02; B29C 59/022; B29C 59/026
USPC ......... 156/285, 382, 209, 228, 242, 245, 580; 264/101, 500, 510, 293; 428/144, 156, 428/158–160
See application file for complete search history.

(56) References Cited

U.S. PATENT DOCUMENTS

| 6,749,794 B2 * | 6/2004 | Spengler ....................... 264/458 |
| 7,101,503 B2 * | 9/2006 | Spengler et al. .............. 264/250 |
| 2006/0042492 A1 * | 3/2006 | Garitano ....................... 101/483 |
| 2006/0134381 A1 * | 6/2006 | Homburg et al. ............. 428/141 |
| 2008/0237930 A1 * | 10/2008 | Evans ........................ 264/328.1 |
| 2009/0115104 A1 * | 5/2009 | Anbarasu et al. ............. 264/319 |

FOREIGN PATENT DOCUMENTS

| DE | 29801561 | 6/1999 |
| EP | 0443292 | 8/1991 |
| FR | 2879495 | 6/2006 |
| GB | 798280 | 7/1958 |

OTHER PUBLICATIONS

French Search Report for application No. FR 1157265, dated Mar. 12, 2012, 2 pages.

* cited by examiner

*Primary Examiner* — Katarzyna Wyrozebski Lee
*Assistant Examiner* — Carson Gross
(74) *Attorney, Agent, or Firm* — Reising Ethington P.C.

(57) ABSTRACT

A vehicle interior trim element has at least one substrate layer covered with a skin having an outer surface containing a plurality of asperities, regularly distributed on the outer surface. The outer surface of the skin defines an outer surface of the trim element that is visible within the vehicle interior. The trim element may be processed by applying a heat source on part of the outer surface forming a decorative area, the application of the heat source being arranged to at least reduce the height of the asperities in the decorative areas such that the decorative area has a different appearance from the rest of the outer surface.

16 Claims, 3 Drawing Sheets

METHOD FOR PRODUCING A TRIM ELEMENT HAVING A DECORATIVE AREA WITH A PARTICULAR APPEARANCE

TECHNICAL FIELD

The present invention relates to a method for producing a vehicle trim element having a covering skin containing outer surface asperities.

BACKGROUND

Interior vehicle trim elements may be formed as a supporting substrate with an overlying skin layer in which its outer surface is visible within the vehicle interior when installed. Sometimes, the skin and substrate are separated by a foam layer, as is known. Such a trim element, for example designed to cover a dashboard, a door panel, or another panel of a vehicle, for example a motor vehicle, makes it possible to define the aesthetics of the passenger cabin of the vehicle. Consequently, it is generally desirable to give the skin of the trim element a particular appearance so as to make the passenger cabin pleasant to see and touch.

To that end, it is for example known to impart a particular texture to the outer surface of the skin, such as a predefined graining. Graining consists of forming a network of asperities on the outer surface of the skin following a particular pattern defining the outer appearance of the trim element. The graining may be more or less fine as a function of the dimensions of the asperities, but there is a minimal fineness beyond which the graining is no longer seen. To give the trim element a pleasant feel, it is known to position the skin under a substrate layer having a certain flexibility, such as a foam layer.

In order to still further improve the aesthetics of the trim element, a provision may be made for adding a decorative element attached on the outer surface of the skin, in a particular area thereof. This decorative element is for example a part made from a plastic, wooden or other material or a pattern formed by one or more inks or of any other suitable nature. It is provided to adhere this decorative element on the outer surface of the skin after or during the assembly thereof with the substrate layer, for example using a heat-activated glue or thermocompression or an ink transfer between a substrate film and the outer surface of the skin or other.

However, the adhesion of such a decorative element is done on the apex of the disparities forming the graining of the outer surface, which causes poor adhesion between the decorative element and the skin and may cause premature wear of the decorative element, or even its detachment from the skin, damaging the appearance of the trim element. In fact, the decorative element does not continuously adhere to the outer surface of the skin, and the adhesion points are not sufficient to ensure robust fastening of the decorative element. Furthermore, it is possible for the step for fastening the decorative element to damage the foam layer positioned under the skin.

SUMMARY

One of the aims of the invention is to offset these drawbacks by providing a method for producing a trim element in which a decorative area can be defined simply and can receive a decorative element robustly.

To that end, the invention relates to the production method for a vehicle trim element having a covering skin with asperities on its outer surface, in which the method comprises a step for applying a heat source on part of the outer surface forming a decorative area, said application being done at a predetermined temperature and pressure for a predetermined period of time and being arranged to at least reduce the height of the asperities in the decorative areas such that the decorative area has a different appearance from the rest of the outer surface.

This method makes it possible to modify the texture of the outer surface of the skin locally so as to define a decorative area. Modifying the texture by modifying or eliminating the graining in the decorative area may impart particular aesthetics to the trim element. Furthermore, a decorative element may easily be added to the decorative area, the adhesion thereof on the outer surface being improved due to the reduced height of the asperities or the elimination thereof.

According to other features of the production method according to the invention:
- the heat source is formed by a press having an application surface with a shape substantially complementary to the shape of the decorative area, said application surface being heated to the predetermined temperature and the press being applied on the decorative area at the predetermined pressure;
- the press comprises means for applying a vacuum on the application surface thereof such that a vacuum is created between the application surface and the outer surface of the skin, said vacuum pressing the decorative area against the application surface during the application step;
- the means for applying a vacuum comprise a plurality of perforations emerging in the visible surface of the press, so as to define a particular pattern, the application of a vacuum between the decorative area and the application surface creating asperities in the decorative area following the pattern of the perforations, said asperities extending at a height lower than the height of the asperities outside the decorative area;
- the press comprises lateral edges protruding from the application surface so as to form grooves in the assembly comprising the substrate layer and the skin during the application step;
- during the application step, the predetermined pressure is substantially comprised between 0.1 and 0.7 bar;
- the predetermined temperature is substantially comprised between 160° C. and 230° C.;
- the predetermined duration is substantially comprised between 10 seconds and 20 seconds;
- the production method comprises an additional step for fastening a decorative element on the decorative area after or during the application step;
- the fastening step comprises a step for arranging the decorative element across from the decorative area and a step for applying a predetermined pressure at a predetermined temperature for a predetermined period of time on the decorative element so as to press it against the decorative area;
- during the fastening step, the predetermined pressure is substantially comprised between 2 bars and 7 bars;
- during the fastening step, the predetermined pressure is substantially comprised between 160° C. and 230° C.;
- during the fastening step, the predetermined duration is substantially comprised between 1 second and 10 seconds; and
- the press comprises thermally insulating elements positioned on each side of the press, or a thermally insulating frame surrounding the press, said elements or said frame resting on the outer surface of the skin on the sides of the decorative area during the application step.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE ILLUSTRATED EMBODIMENTS

In the description, "outer" defines everything that is visible from the outside, for example from the passenger cabin of the vehicle, and "inner" designates everything that is not visible from the outside.

Figure 1:
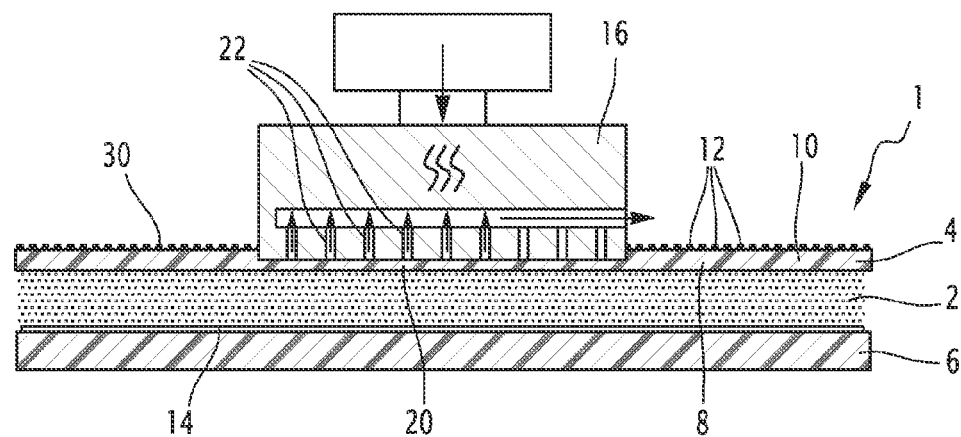
FIG. 1 is a diagrammatic cross-sectional illustration of the trim element during the step for applying a heat source of the method according to the invention.
Figure 2:
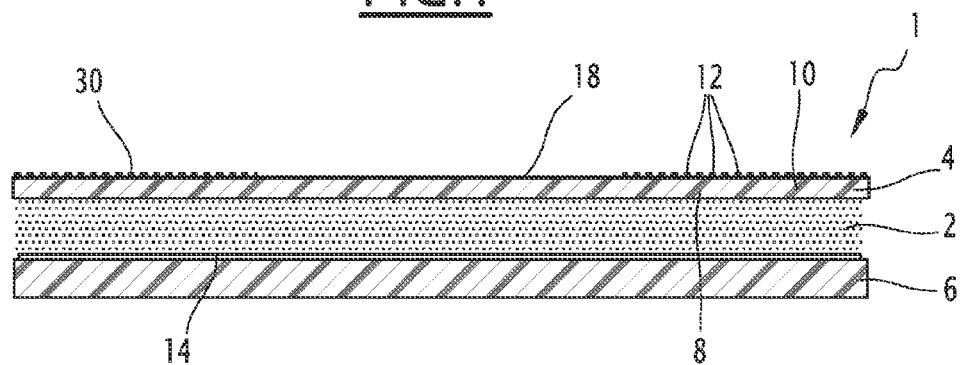
FIG. 2 is a diagrammatic cross-sectional illustration of the trim element resulting from the application step of FIG. 1.

In reference to FIGS. 1 and 2, an embodiment is described of the trim element 1 comprising a substrate layer 2 covered by a skin 4. According to the embodiment shown in the figures, the substrate layer 2/skin 4 assembly tops a rigid insert 6. Such a trim element 1 is for example designed to cover a dashboard, a door panel, or another panel of a vehicle.

The substrate layer 2 is for example made up of a flexible foam layer made from a plastic material, such as polypropylene (PP) or polyvinyl chloride (PVC), arranged to give the trim element 1 a pleasant feel.

The skin 4 is a thermoplastic sheet, for example made from thermoplastic polyolefin (TPO) or from PVC, and comprises an inner surface 8, covering the substrate layer 2, and an outer surface 10 forming the outer face, therefore designed to be visible from the outside, of the trim element 1. The outer surface 10 is "grained" so as to impart a particular appearance to the trim element 1. This graining consists of forming a network of asperities 12 regularly distributed over the outer surface 10 following a particular pattern and extending in the raised portions from said surface 10, i.e. protruding toward the outside of the outer surface 10. As an example, the asperities extend at a height substantially comprised between 10 μm and 100 μm protruding from the outer surface, as a function of the fineness of the graining. The asperities 12 can be formed during fastening of the skin 4 on the substrate layer 2 in order to form the substrate layer 2/skin 4 assembly, which is for example done by thermal compression or overmolding of the skin. In these cases, an inner wall of the tool forming the substrate layer 2/skin 4 assembly, against which the outer surface 10 of the skin 2 is applied during formation, is textured so as to form the graining on the outer surface 10. Such a graining method of the outer surface of the skin 4 is known in itself and will not be described in detail here.

The rigid insert 6 makes it possible to impart a certain rigidity and a certain strength to the trim element 1, so that the latter can for example support objects or bear against the outer surface 10. The rigid insert 6 is for example made from PP, propylene polymer alone, called homopolymer, or from P/E, the copolymer of propylene and ethylene, or an alloy of polycarbonate and acrylonitrile butadiene styrene (PC/ABS). These materials may potentially be reinforced by mineral fillers, for example talc, or fibers, for example glass fibers. The substrate layer 2/skin 4 assembly is for example glued on the rigid insert 6 using a heat-activated glue 14 or the rigid insert 6 may be overmolded on the substrate layer 2/skin 4 assembly.

During a first step of the method, the trim element 1 described above is formed, i.e. the substrate layer 2/skin 4 assembly is made and that assembly is fastened on the insert 6. The graining of the skin is done before or during the first step for forming the trim element. In this way, after this first step, the assembly of the trim elements 1 thus formed are all identical. They have a first finishing level with a certain aesthetic and can be assembled in the vehicles. If a higher level of aesthetics is desired, a sub-assembly of that assembly may then undergo an additional treatment aiming to form a decorative area, in a second step.

Figure 4:
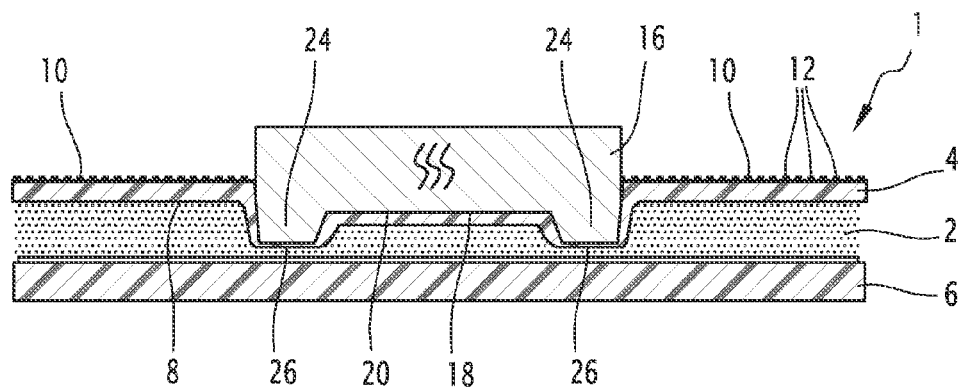
FIG. 4 is a diagrammatic cross-sectional illustration of a trim element during the step for applying a heat source according to another embodiment of the method according to the invention.
Figure 9:
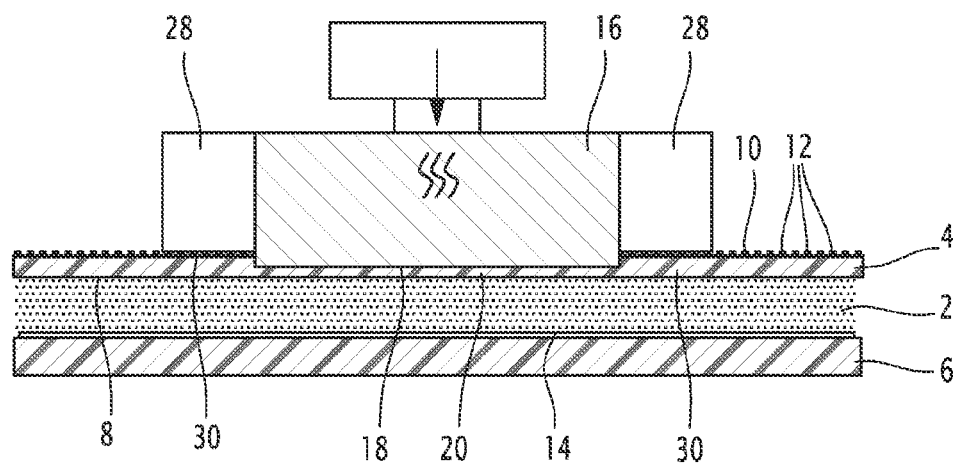
FIG. 9 is a diagrammatic cross-sectional illustration of a trim element during the step for applying a heat source according to still another embodiment of the method according to the invention.

During a second step after the first, shown in FIGS. 1, 4 and 9, a heat source 16 is applied on a predefined area of the outer surface 10 forming a decorative area 18 whereof the appearance is designed to be different from the appearance of the rest of the outer surface 10.

The heat source 16 is formed by a press comprising an application surface 20, positioned across from the outer surface 10 of the skin 4 and heated so as to apply a certain predetermined temperature, at a predetermined pressure and for a predetermined period of time, on the decorative area 18. The application surface 20 has a shape substantially complementary to the shape of the desired decorative area 18. In fact, it is this application surface 20 that defines the shape of the decorative area 18 by modifying the appearance of that area 18, as will be described.

The application of a predetermined temperature results in melting at least part of the asperities 12 in the decorative area 18 such that the height of those asperities decreases or the asperities disappear, as shown in FIG. 2. After the step for applying the heat source 16, the decorative area 18 therefore comprises asperities, with a height smaller than the height of the asperities 12 on the rest of the outer surface 10, or has a planar surface provided with no asperities. The choice of the predetermined pressure and the application time period of the application surface 20 makes it possible to select the desired height of the asperities in the decorative area 18 or to eliminate the asperities in that area.

In one embodiment, in which the skin 4 is made from TPO, the predetermined temperature is for example substantially equal to 170° Celsius, the predetermined pressure is substantially comprised between 0.1 and 0.7 bar, and the application period is substantially comprised between 10 seconds and 20 seconds.

In one embodiment, in which the skin 4 is made from PVC, the predetermined temperature is substantially equal to 220° C., the other parameters being identical to the case in which the skin 4 is made from TPO.

In general, the predetermined temperature is substantially comprised between 160° C. and 230° C. as a function of the material of the skin 4 and the modification one wishes to make to the asperities 12 of the decorative area 18.

It will be noted that, according to these embodiments, the predetermined pressure is particularly low, such that the press practically does not bear on the outer surface 10 in the decorative area 18. The applicant has surprisingly observed that the erasure of the asperities was improved by this low pressure compared to a high pressure. This is due to the shape memory of the outer surface 10 of the skin 4, which returns to the smooth state it had before the graining by calendaring. Furthermore, such pressure makes it possible not to irreversibly damage the layer of foam 2 under the skin 4. In fact, a high pressure could cause an irreversible deformation of the foam layer 2. Furthermore, the foam layer 2 would then be more sensitive to the high temperature of the application surface 20. With a low pressure, the foam layer 2 only slightly deforms and can return to its initial shape due to its elasticity. Furthermore, the low pressure limits the influence of the temperature on the foam layer 2, the temperature "perceived" by the foam layer 2 then being insufficient to damage it.

According to one embodiment shown in FIG. 1, the means for applying a vacuum are provided on the application surface 20 such that a vacuum is created between the application surface 20 and the outer surface 10 of the skin 4, said vacuum pressing the decorative area 18 against the application surface 20 during the application step, which makes it possible to improve the application of the heat on the decorative area 18 without increasing the pressure exerted on the foam layer 2/skin 4 assembly. The means for applying a vacuum comprise a plurality of perforations 22, emerging in the application surface 20 and, for example, connected to a vacuum pump (not shown). By choosing a particular pattern of perforations 22 and adjusting the vacuum pump appropriately, it will be noted that it is possible to change the texture of the decorative area 18 by creating a new graining. In fact, the perforations 22 can be adapted to create asperities on the decorative area 18, said asperities then reproducing the pattern in which the perforations 22 are arranged. In this way, it is possible to modify the appearance of the decorative area 18 in relation to the rest of the outer surface 10.

Figure 5:
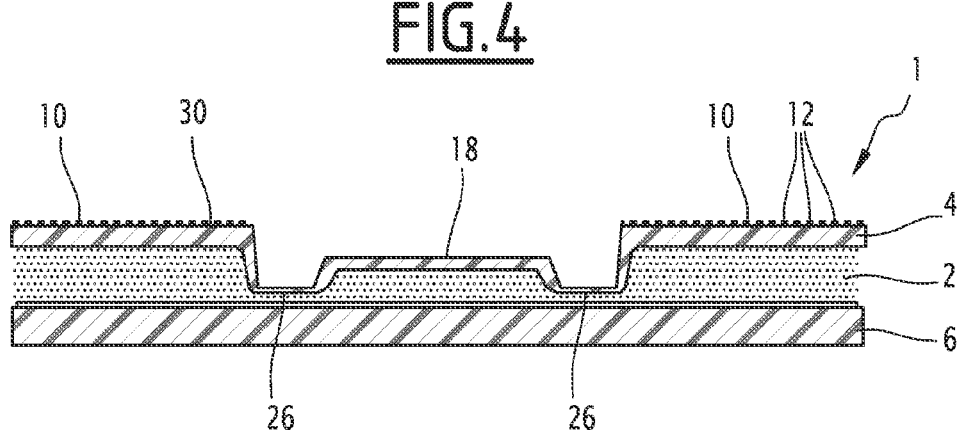
FIG. 5 is a diagrammatic cross-sectional illustration of the trim element resulting from the application step of FIG. 4, FIGS. 6 to 8 are diagrammatic cross-sectional illustrations of a trim element during the step for fastening a decorative element according to the other embodiment of the method according to the invention.

According to one embodiment, the press comprises lateral edges 24 on either side of the application surface 20, said edges protruding from the application surface 20 toward the outer surface 10 of the skin 4, so as to form grooves 26 in the substrate layer 2/skin 4 assembly during the application step, as shown in FIGS. 4 and 5. The presence of grooves 26 defining the periphery of the decorative area 18 makes it possible to have a clear delimitation of that decorative area 18.

It will be noted that according to the embodiment shown in FIG. 4, the press is arranged to sink into the substrate layer 2/skin 4 assembly such that the decorative area 18 extends withdrawn relative to the outer surface 10 of the skin 4, the decorative area 18 thereby forming a hollow in the trim element 1. Such an embodiment is obtained by increasing the predetermined pressure applied during the step for applying the heat source 16. This embodiment makes it possible to obtain a particular decorative area 18, but causes a deformation of the substrate layer 2, as shown in FIG. 5. The presence of the lateral edges 24 on the press is not related to the embodiment in which the press sinks into the substrate layer 2/skin 4 assembly. The lateral edges 24 can also be provided to form grooves 26 with a press arranged to exert only a very light bearing on the substrate layer 2/skin 4 assembly, as described relative to FIGS. 1 and 2.

According to one embodiment more particularly shown in FIG. 9, the press also comprises two thermally insulating elements 28, or a thermally insulating frame, arranged on each side of the press, or over the entire periphery of the press, so as to rest on the outer surface 10 of the skin 4 on the sides of the decorative area 18 during the application step. The elements 28 or the frame are made from a thermally insulating material or a material with low heat conduction, which preserves the temperature of the application surface 20. These insulating elements 28 each comprise an application surface 30 substantially parallel to the application surface 20 of the heat source 16, this application surface 30 being kept at ambient temperature so as to have a temperature significantly lower than the temperature applied by the application surface 20 of the heat source 16 during the application step. Furthermore, the surface of the elements or the frame in contact with the application surface 20 is reflective so as to return the heat released by that application surface 20 into the application surface. The insulating elements 28 arranged on the periphery of the decorative area 18 during the application step make it possible to avoid the creep phenomena of the skin 4 due to the application of a high temperature on the decorative area 18. One thereby avoids deforming the skin 4 irreversibly around the decorative area 18, which would be detrimental to the appearance of the outer surface 10 of the skin 4.

Inasmuch as the appearance of the decorative area 18 is modified during the application step described above, the production method may be stopped after that step, by providing an outer surface 10 having a first graining pattern and a decorative area 18 having a second graining pattern, different from the first. A particular aesthetic is thus given to the trim element. The particular aesthetic of this trim element is obtained by producing the second pattern on the skin once the skin is assembled on the rigid substrate, and not before it is assembled on the rigid substrate as is known by those skilled in the art. This order makes it possible to improve the positioning of the decorative area 18 in relation to the trim element. Thus, by applying this second step to a trim element sub-assembly 1 formed in step 1, one advantageously obtains a sub-assembly of trim elements having a higher finishing level than that obtained in the first step. Furthermore, this differentiation and improvement of the aesthetics obtained by the second step is done simply and inexpensively.

However, the production method according to the invention also provides for fastening a decorative element 32 in the decorative area 18 so as to still further improve the aesthetics of the trim element 1. In the rest of the description, this trim element 32 will be described as a decorated label 34, supported by a substrate film 36 and transferable from the substrate film 36 to the decorative area 18 by applying a predetermined temperature. It is, however, understood that the decorative element 32 could be of any suitable nature, such as a part, or medallion, made from plastic or wood or another material or a pattern formed by one or more inks.

According to one embodiment that is not shown, the label 34 is fastened in the decorative area 18 at the same time as a heat source 16 is applied in the decorative area 18. In this embodiment, the substrate film 36 bearing the label 34 is inserted between the press and the outer surface 10 of the skin 4 so that an adhesive surface of the label extends across from the decorative area 18. When the application surface 20 of the press is applied against the decorative area 18, the adhesive surface of the label is therefore applied against the decorative area 18 and the temperature of the application surface 20 of the press makes it possible to transfer the label 34 from the substrate film 36 to the decorative area 18 in a known manner. This embodiment is particularly advantageous, as it allows very precise positioning of the label 34 in the decorative area. Furthermore, the fastening of the label being done at the same time as the step for applying a heat source, this embodiment makes it possible to reduce the production cycle times as well as costs.

In the embodiment shown in FIGS. 3 and 6 to 8, the step for fastening the decorative element 32 is carried out after the step for applying the heat source 16, once the decorative area 18 has been defined. In fact, separating the fastening step from the application step makes it possible to vary the temperature, pressure, and application time parameters between the application step and the fastening step, which makes it possible to improve the fastening of the decorative element 32, as will be described now.

Figure 3:
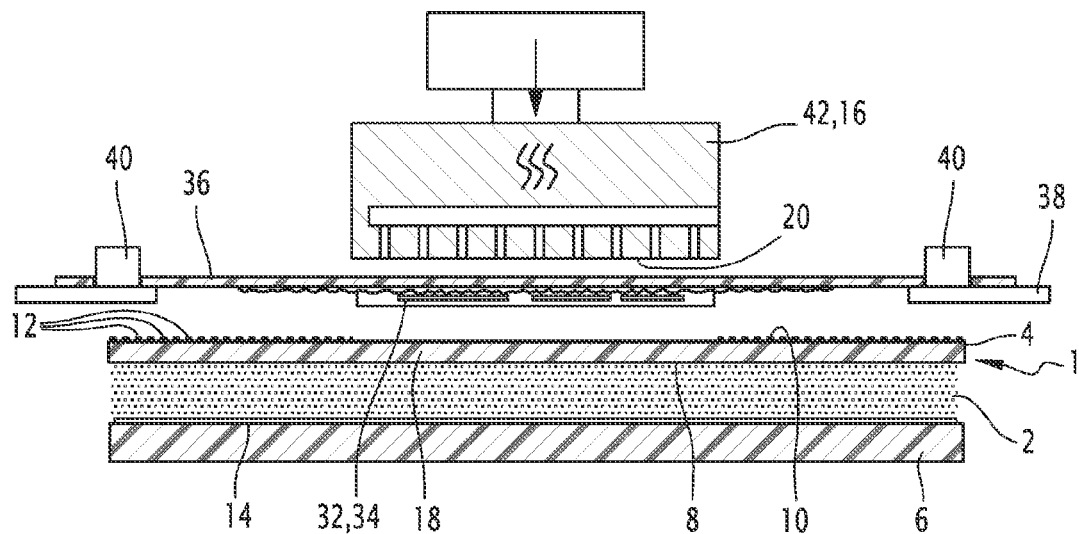
FIG. 3 is a diagrammatic cross-sectional illustration of a trim element during the step for fastening a decorative element of the method according to the invention.

Once the decorative area 18 has been produced, by reducing the height of the asperities or eliminating them in that area, the label 34 supported by the substrate film 36 is positioned across from the decorative area 18, as shown in FIG. 3. It will be noted that the formation of the groove 26 on the perimeter of the decorative area 18, as previously described, can make the positioning of the decorative element 32 easier by helping reference the decorative area 18 in relation to the rest of the outer surface 10.

The substrate film 36 is supported by a maintenance frame 38 for example comprising positioning pins 40 for the substrate film 36, these pins 40 cooperating with openings provided in the film 36 so that when the pins are inserted into the corresponding openings, the label 34 is positioned across from the decorative area 18, as shown in FIG. 3.

The substrate film 36 and the label 34 are inserted between the outer surface of the skin 4 and a heating press 42. This heating press 42 can be that used to carry out the application step previously described, as shown in FIG. 3, or another press arranged to facilitate the application of the label 34, as shown in FIG. 6.

Figure 6:
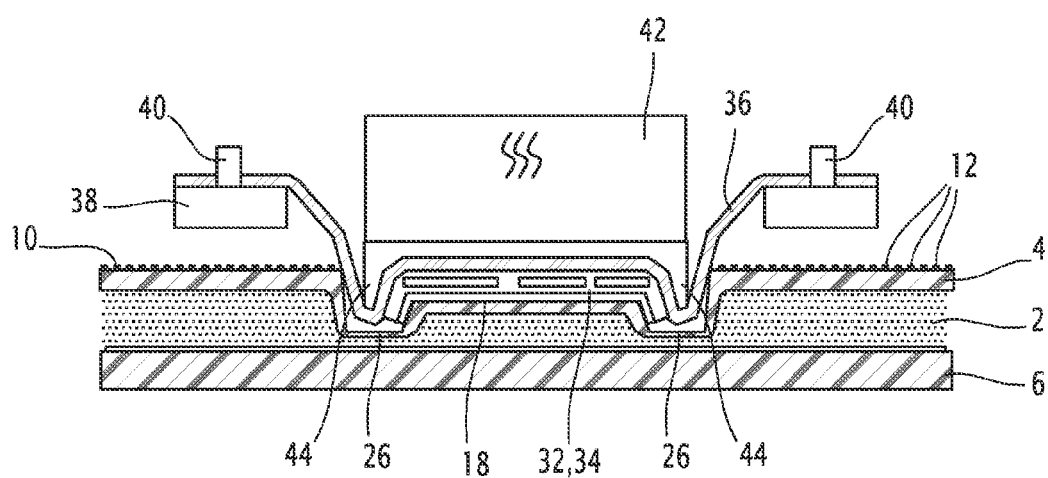

The press 42 is applied against the substrate film 36, during a step for applying a predetermined pressure at a predetermined temperature for a predetermined time against the decorative element 32, so as to press the label against the decorative area 18 as shown in FIG. 6. As shown in this figure, the press 42 is provided with protrusions 44 arranged to apply the edges of the label 34 against the walls of the groups 26.

During this step, the adhesive surface of the label 34, covered with a heat-activated glue, adheres against the decorative area 18 due to the heat applied by the press 42.

According to one embodiment, in which the skin 4 is made from TPO, the predetermined temperature is for example substantially equal to 170° C., the predetermined pressure is substantially comprised between 2 and 7 bars, and the application time is substantially comprised between 1 second and 10 seconds.

According to one embodiment, in which the skin 4 is made from PVC, the predetermined temperature is substantially equal to 220° C., the other parameters being identical to the case in which the skin 4 is made from TPO.

In general, the predetermined temperature is substantially comprised between 160° C. and 230° C. as a function of the material of the skin 4 and the nature of the decorative element 32.

It will be noted that the pressure applied during the fastening step is significantly higher than that applied during the application step. Such pressure makes it possible to ensure good adhesion of the label 34 on the decorative area 18, and in particular to ensure that the adhesion force between the label 34 and the decorative area 18 is greater than the adhesion force between the label 34 and the substrate film 36. In return for the pressure increase, the application time of that pressure is significantly shorter than the duration of the application step. One thus ensures that the high temperature is applied for a short amount of time so as not to damage the substrate layer 2. Furthermore, this short application time of the high pressure does not deform the substrate layer 2 irreversibly, and the latter regains its initial shape after the press 42 is removed due to the elasticity of the foam.

Figure 7:
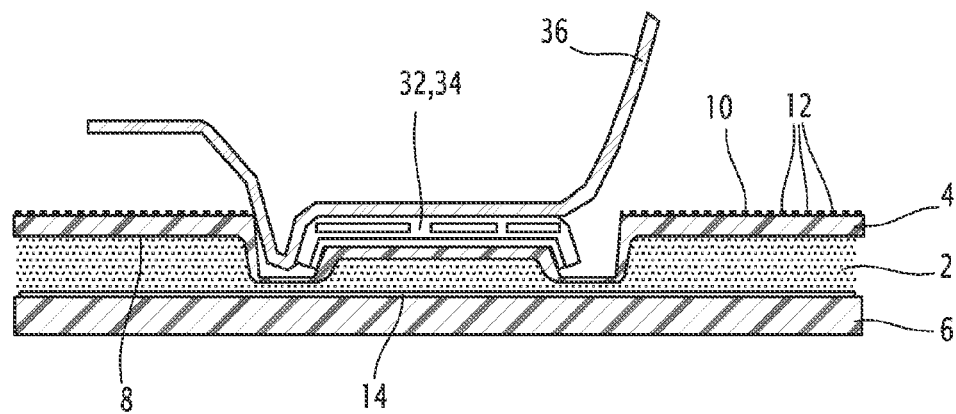
Figure 8:
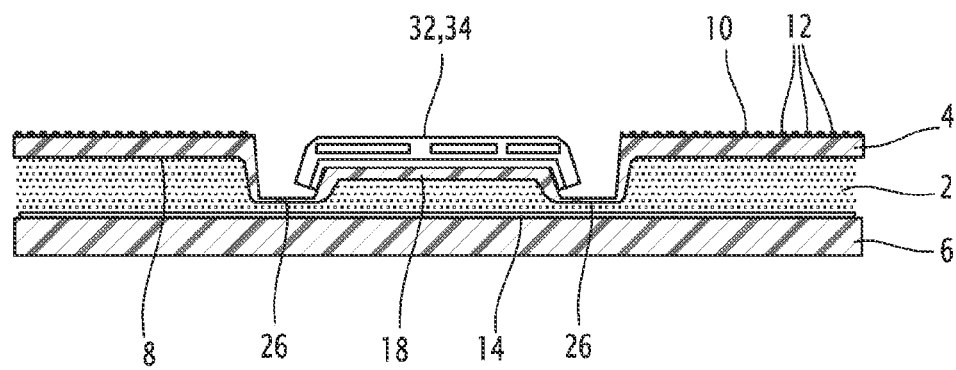

Once the press 42 is removed, the substrate film 36 can be removed by peeling, in a known manner, as shown in FIG. 7, which leaves the label 34 in place on the decorative. 18, as shown in FIG. 8.

In the embodiment where the grooves 26 are made, the edges of the label 34 are positioned in those grooves 26, which imparts better aesthetics to the trim element and allows the decorative element 32 to better withstand abrasion and protect the label 34 from accidental tearing.

All of these methods for applying the label 34 on the decorative area advantageously make it possible to form a new sub-assembly of the sub-assembly already formed in the second step, having even better aesthetics.

The method thus described advantageously makes it possible to form a range of trim elements made up of at least two sub-assemblies of trim elements having two different appearance levels. A first sub-assembly is made up of trim elements having a grained skin without a decorative area. The second sub-assembly is made up of trim elements having a grained skin on which a decorative area has been produced. The range of trim elements may also include a third sub-assembly in which a label has been placed in the decorative area according to one of the embodiments explained above.

It will be noted that the label 34 adheres well to the decorative area 18 due to the small height of the asperities present in that area or the absence of asperities in that area. This allows the label 34 to adhere to a large surface of the decorative area 18 and not only the apex of the asperities, as would be the case if the decorative area 18 had not been modified relative to the rest of the outer surface 10 of the skin 4.

The invention claimed is:

1. A method for producing a vehicle trim element, comprising the steps of:

forming an assembly comprising a substrate layer and a skin directly applied on the substrate layer, the skin having an outer surface that includes a plurality of asperities regularly distributed on said outer surface and protruding from said surface, the outer surface of the skin defining a visible outer surface of said assembly; and applying a heat source on part of a outer surface at a predetermined temperature and pressure for a predetermined period of time to form a decorative area where the height of the asperities is reduced such that the decorative area has a different appearance from the rest of the outer surface, wherein the step of applying the heat source is performed such that the substrate layer is not irreversibly damaged or deformed at the decorative area.

2. The method according to claim 1, wherein the heat source is provided by a press having an application surface with a shape substantially complementary to the shape of the decorative area, said application surface being heated to the predetermined temperature and the press being applied on the decorative area at the predetermined pressure.

3. The method according to claim 2, wherein a vacuum is provided between the application surface and the outer surface of the skin, said vacuum pressing the decorative area against the application surface during the step of applying the heat source.

4. The method according to claim 3, wherein the vacuum is provided via a plurality of perforations in the application surface of the press, so as to define a particular pattern, the vacuum between the decorative area and the application surface creating asperities in the decorative area following the pattern of the perforations, said vacuum-created asperities extending at a height lower than the height of the asperities outside the decorative area.

5. The method according to claim 1, wherein, during the step of applying the heat source, the predetermined pressure is substantially between 0.1 and 0.7 bar.

6. The method according to claim 1, wherein the predetermined temperature is substantially between 160° C. and 230° C.

7. The method according to claim 1, wherein the predetermined period of time is substantially between 10 seconds and 20 seconds.

8. The method according to claim 1, further comprising a step of fastening a decorative element on the decorative area after or during the step of applying the heat source.

9. The method according to claim 8, the step of fastening comprising the steps of:
   arranging the decorative element across from the decorative area; and
   applying a predetermined pressure at a predetermined temperature for a predetermined period of time on the decorative element so as to press it against the decorative area.

10. The method according to claim 9, wherein, during the step of fastening, the predetermined pressure is substantially between 2 bars and 7 bars.

11. The method according to claim 9, wherein, during the step of fastening, the predetermined temperature is substantially between 160° C. and 230° C.

12. The method according to claim 9, wherein, during the step of fastening, the predetermined period of time is substantially between 1 second and 10 seconds.

13. The method according to claim 2, wherein the press comprises thermally insulating elements positioned on each side of the press, or a thermally insulating frame surrounding the press, said elements or said frame resting on the outer surface of the skin on the sides of the decorative area during the step of applying the heat source.

14. A method for producing a vehicle trim element, comprising the steps of:
   forming an assembly comprising at least one substrate layer covered with a skin having an outer surface that includes a plurality of asperities regularly distributed on said outer surface and protruding from said surface, the outer surface of the skin defining an outer surface of said assembly; and
   applying a heat source on part of the outer surface at a predetermined temperature and pressure for a predetermined period of time, said step of applying the heat source forming a decorative area and being arranged to at least reduce the height of the asperities in the decorative area such that the decorative area has a different appearance from the rest of the outer surface,
   wherein the heat source is provided by a press having an application surface with a shape substantially complementary to the shape of the decorative area, said application surface being heated to the predetermined temperature and the press being applied on the decorative area at the predetermined pressure,
   wherein a vacuum is provided between the application surface and the outer surface of the skin, said vacuum pressing the decorative area against the application surface during the step of applying the heat source, and
   wherein the vacuum is provided via a plurality of perforations in the application surface of the press so as to define a particular pattern, the vacuum creating asperities in the decorative area following the pattern of the perforations, said vacuum-created asperities extending at a height lower than the height of the asperities outside the decorative area.

15. The method according to claim 14, wherein the press comprises lateral edges protruding from the application surface so as to form grooves in the assembly during the step of applying the heat source.

16. A method for producing a vehicle trim element, comprising the steps of:
   forming an assembly comprising at least one substrate layer covered with a skin having an outer surface that includes a plurality of asperities regularly distributed on said outer surface and protruding from said surface, the outer surface of the skin defining an outer surface of said assembly; and
   applying a heat source on part of the outer surface at a predetermined temperature and pressure for a predetermined period of time, said step of applying the heat source forming a decorative area and being arranged to at least reduce the height of the asperities in the decorative area such that the decorative area has a different appearance from the rest of the outer surface,
   wherein the heat source is provided by a press having an application surface with a shape substantially complementary to the shape of the decorative area, said application surface being heated to the predetermined temperature and the press being applied on the decorative area at the predetermined pressure, and
   wherein the press comprises lateral edges protruding from the application surface so as to form grooves in the assembly during the step of applying the heat source.

* * * * *